(12) United States Patent  
Pearcy

(10) Patent No.: US 9,250,928 B2
(45) Date of Patent: Feb. 2, 2016

(54) COOPERATIVE MOBILE ANALYTICS

(75) Inventor: Derek Patton Pearcy, San Francisco, CA (US)

(73) Assignee: McAfee, Inc., Santa Clara, CA (US)

( * ) Notice: Subject to any disclaimer, the term of this patent is extended or adjusted under 35 U.S.C. 154(b) by 388 days.

(21) Appl. No.: 13/340,341

(22) Filed: Dec. 29, 2011

(65) Prior Publication Data

US 2013/0097518 A1 Apr. 18, 2013

Related U.S. Application Data

(60) Provisional application No. 61/548,411, filed on Oct. 18, 2011.

(51) Int. Cl.
*G06F 3/048* (2013.01)
*G06F 9/44* (2006.01)
*G06F 9/54* (2006.01)
*H04W 4/00* (2009.01)

(52) U.S. Cl.
CPC .............. *G06F 9/4445* (2013.01); *G06F 9/542* (2013.01); *G06F 2209/545* (2013.01); *H04W 4/008* (2013.01)

(58) Field of Classification Search
None
See application file for complete search history.

(56) References Cited

U.S. PATENT DOCUMENTS

| 5,987,610 | A | 11/1999 | Franczek et al. |
| 6,073,142 | A | 6/2000 | Geiger et al. |
| 6,460,050 | B1 | 10/2002 | Pace et al. |
| 6,826,551 | B1 | 11/2004 | Clary et al. |
| 7,246,370 | B2 | 7/2007 | Valente et al. |
| 7,451,488 | B2 | 11/2008 | Cooper et al. |
| 7,506,155 | B1 | 3/2009 | Stewart et al. |
| 8,074,256 | B2 | 12/2011 | Valente et al. |
| 2006/0015562 | A1 | 1/2006 | Kilian-Kehr et al. |
| 2006/0164771 | A1 | 7/2006 | Heidepriem |
| 2006/0212519 | A1* | 9/2006 | Kelley et al. ................. 709/206 |
| 2007/0066310 | A1 | 3/2007 | Haar et al. |
| 2007/0118662 | A1 | 5/2007 | Vishwanathan et al. |

(Continued)

FOREIGN PATENT DOCUMENTS

| CN | 101454774 A | 6/2009 |
| CN | 101622610 A | 1/2010 |

(Continued)

OTHER PUBLICATIONS

Information Technology Risk Management, Copyright 2002, © Glen B. Alleman, Niwor, Colorado, 22 pages.

(Continued)

*Primary Examiner* — Anil N Kumar
(74) *Attorney, Agent, or Firm* — Patent Capital Group

(57) ABSTRACT

A first computing device running a particular program is used to identify a second computing device also running the particular program and substantially co-located with the first computing device in a particular physical location. The first computing device and the second computing device are joined in a use session of the particular program. It is determined that the first computing device displays a first user interface of the particular program at a first instance, the first user interface showing a first context in a plurality of contexts. The second computing device displays a second user interface of the particular program at the first instance based at least in part on the first user interface showing the first context, the second user interface showing a second context in the plurality of contexts.

24 Claims, 8 Drawing Sheets

(56) References Cited

U.S. PATENT DOCUMENTS

| | | |
|---|---|---|
| 2007/0208992 A1 | 9/2007 | Koren |
| 2007/0273583 A1* | 11/2007 | Rosenberg .................... 342/367 |
| 2008/0109870 A1 | 5/2008 | Sherlock et al. |
| 2010/0067390 A1* | 3/2010 | Valente et al. ................ 370/252 |
| 2010/0257576 A1 | 10/2010 | Valente et al. |
| 2011/0083111 A1* | 4/2011 | Forutanpour et al. ......... 715/863 |
| 2011/0102459 A1* | 5/2011 | Hall .............................. 345/633 |
| 2011/0225622 A1 | 9/2011 | Pearcy et al. |
| 2011/0258117 A1* | 10/2011 | Ahmad et al. ................... 705/44 |
| 2011/0307788 A1* | 12/2011 | Cheung et al. ................ 715/731 |
| 2012/0198350 A1* | 8/2012 | Nhiayi .......................... 715/740 |

FOREIGN PATENT DOCUMENTS

| | | |
|---|---|---|
| CN | 101981558 A | 2/2011 |
| WO | WO 03/030051 A1 | 4/2003 |
| WO | WO 2004-049196 A2 | 6/2004 |
| WO | 2013/059359 A1 | 4/2013 |

OTHER PUBLICATIONS

International Search Report and Written Opinion, International Application No. PCT/US2012/060666, mailed Feb. 8, 2013, 8 pages.

International Preliminary Report on Patentability with Written Opinion received for PCT Patent Application No. PCT/US2012/060666, mailed on Apr. 22, 2014, 4 pages.

Supplementary European Search Report in EP Application No. EP 12 84 1490, mailed on Jul. 8, 2015, 7 pages.

Notice of First Office Action in CN 201280051103.X, mailed on Oct. 19, 2015, English translation, 5 pages.

* cited by examiner

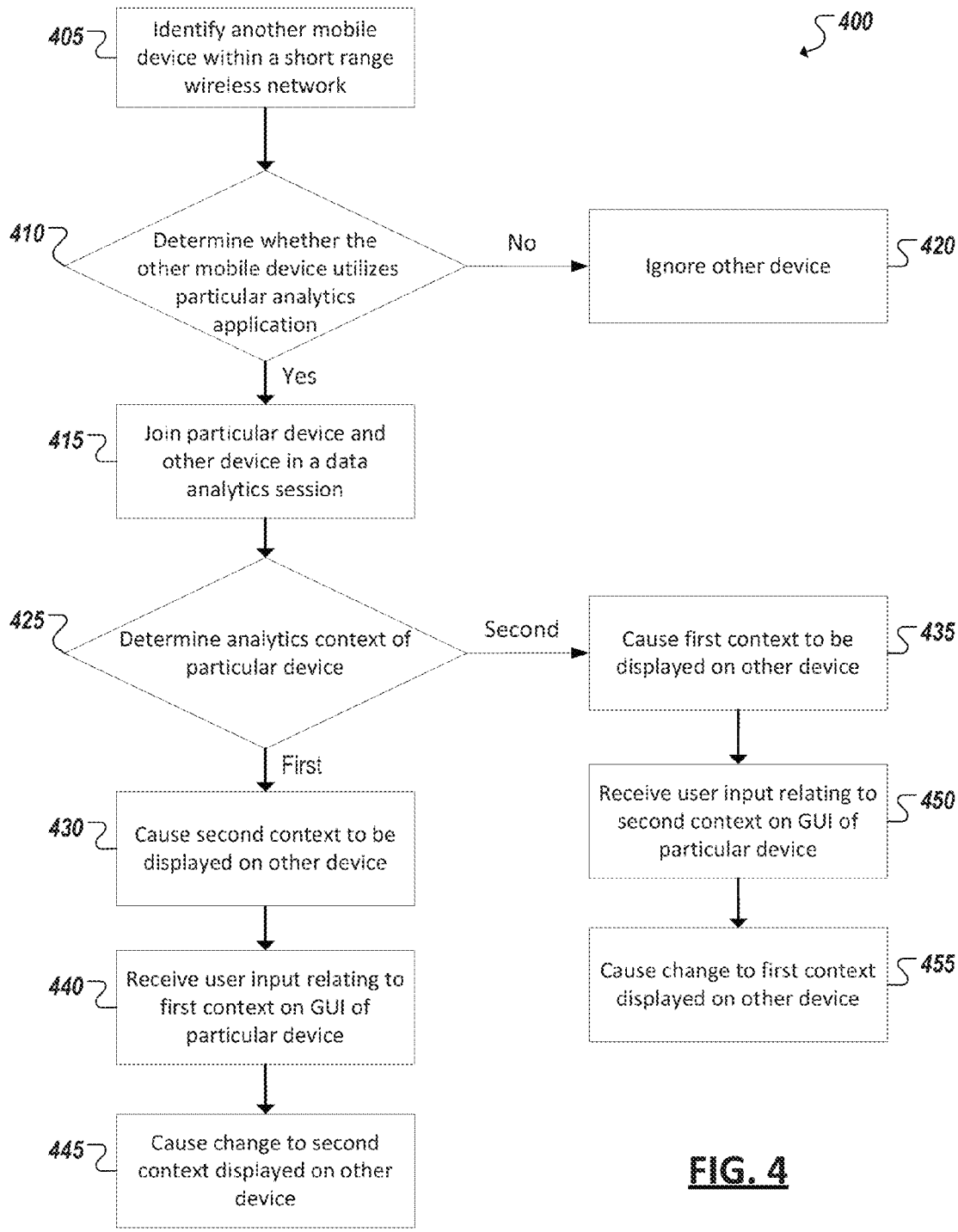

COOPERATIVE MOBILE ANALYTICS

This patent application claims the benefit of priority under 35 U.S.C. §120 of U.S. Provisional Patent Application Ser. No. 61/548,411, filed Oct. 18, 2011, entitled "COOPERATIVE MOBILE ANALYTICS", which is expressly incorporated herein by reference in its entirety.

TECHNICAL FIELD

This disclosure relates in general to the field of software user interfaces and, more particularly, to analytics software user interfaces.

BACKGROUND

Advances in computing have allowed people and systems to communicate in new and revolutionary ways. Graphical user interfaces are being developed that assist in the communication of concepts to and performance of tasks by users of software programs and applications. Some graphical user interfaces have been developed that allow users to control other computing devices from a remote computing device. User interfaces can be employed to assist and direct users in their manipulations of other computing devices, including remote display devices. Further, recent developments in video gaming have introduced the use of content-rich controllers that can be utilized by users to interact with a second user interface provided at least in part by a second computing device. In such systems, a first user interface is displayed on the controller device itself thereby supplementing a second, main user interface device, such as a television connected to or integrated with a video game console. Examples of such systems include Nintendo Co., Ltd.'s Wii™ U™ prototype and Apple Inc.'s Apple TV™'s airplay game mirroring technology allowing a user to utilize Apple™ iPad™ devices as controllers in video games displayed in part on an Apple TV and in part on an Apple iPad.

BRIEF DESCRIPTION OF THE DRAWINGS

FIG. 4 is a simplified flowchart illustrating example operations associated with at least some embodiments of the system.

Like reference numbers and designations in the various drawings indicate like elements.

DETAILED DESCRIPTION OF EXAMPLE EMBODIMENTS

Overview

Figure 1:
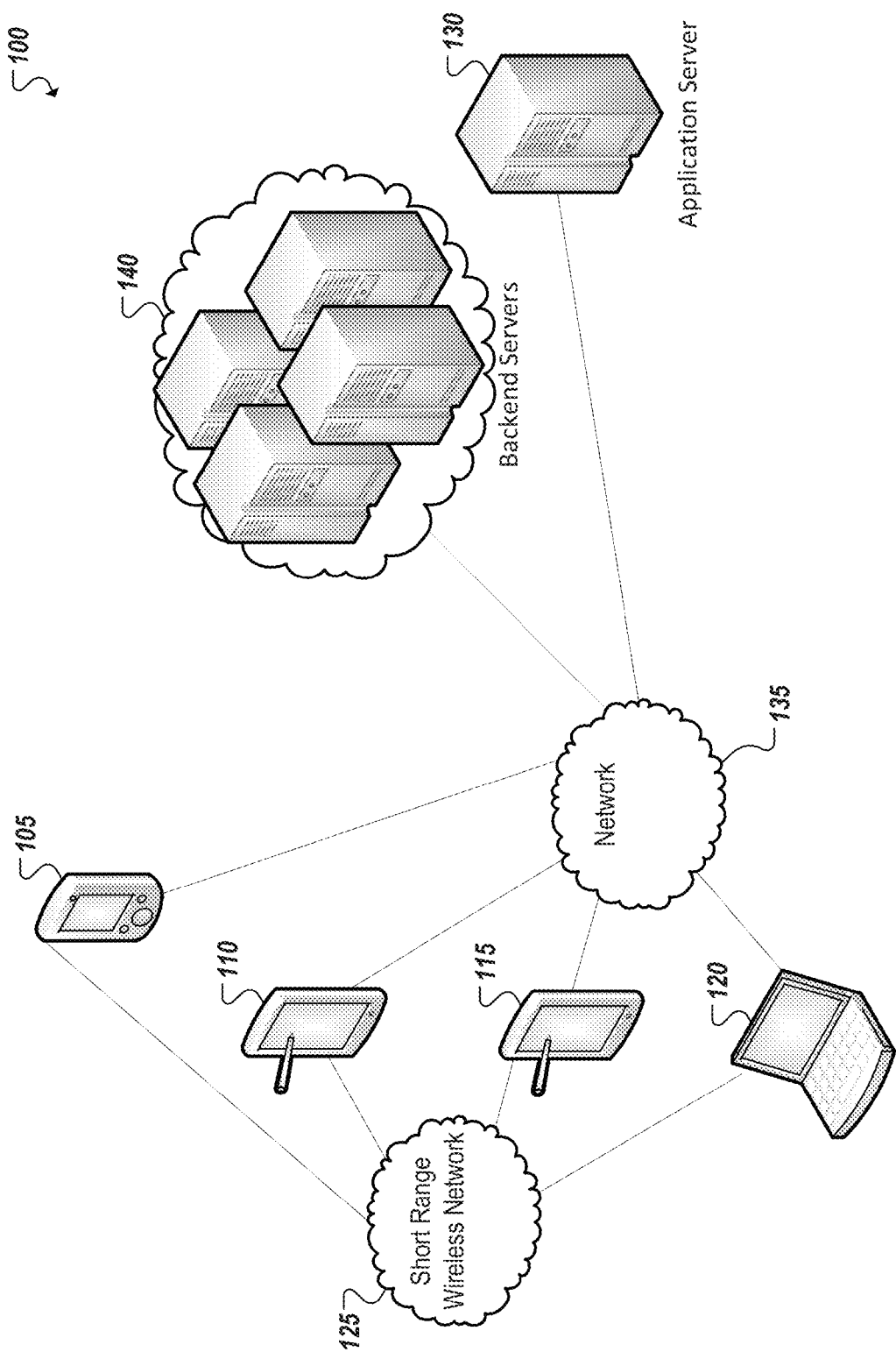
FIG. 1 is a simplified schematic diagram of an example computing system including one or more mobile computing devices in accordance with one embodiment.

In general, one aspect of the subject matter described in this specification can be embodied in methods that include the actions of identifying, using a first computing device running a particular program to identify that a second computing device, also running the particular program, is identified as substantially co-located with the first computing device in a particular physical location. The first computing device and the second computing device can be joined in a use session of the particular program. It can be determined that the first computing device displays a first user interface of the particular program at a first instance, the first user interface showing a first context in a plurality of contexts. The second computing device can be caused to display a second user interface of the particular program at the first instance based at least in part on the first user interface showing the first context, the second user interface showing a second context in the plurality of contexts.

Further, in another general aspect, a system can be provided including at least one processor device, at least one memory element, and an analytics application. The analytics application, when executed by the processor, can identify a second computing device running a program compatible with the particular program that is identified as substantially co-located with the first computing device in a particular physical location. The analytics application can further join the first computing device and the second computing device in a use session of involving the particular program, determine that the first computing device displays a first user interface of the particular program at a first instance showing a first context, and cause the second computing device to display a second user interface at the first instance based at least in part on the first user interface showing the first context, the second user interface showing a second context.

These and other embodiments can each optionally include one or more of the following features. A first user input can be received at the first computing device at a second instance subsequent to the first instance. The first user input can be communicated to the second computing device to effect a change on the second user interface of the particular program resulting in presentation of an updated second user interface on the second computing device. The first user input can also effect a particular change on the first user interface of the particular program resulting in presentation of an updated first user interface on the first computing device. The first user input can be received through the first user interface. The use session can be a collaborative analytics session and the particular program can include an analytics application. An analytics operation in the first context can affect data included in the second context. The analytics operation can filter data within the first context to identify a first subset of data and the analytics operation can affect data included in the second context by filtering the data included in the second context according to the filtering of data within the first context. The analytics operation can be performed using the first user interface at a second instance subsequent to a first instance and can cause a change to the first user interface, the first user interface displaying a representation of the data within the first context at the first instance and a changed representation of the filtered data at the second instance. The filtering of data included in the second context in response to the analytics operation can cause a change to the second user interface, the second user interface displaying a representation of the data within the second context at the first instance and a changed representation of the filtered data after the second instance. Each instance of the analytics application on the first and second computing devices can access a particular data set and the collaborative analytics session can involve analytics on the particular data set. The particular data set can be provided by a server remote from the first and second computing devices. Each instance of the analytics application on the first and second computing devices can access the particular data set in a respective cache of the first and second computing devices. The caches of the first and second computing devices can be coordinated so that the particular data set is accessible from each of the caches of the first and second computing devices.

Further, embodiments can each optionally include one or more of the following features. A request can be received at the first computing device requesting that a user interface of the particular program present data in a particular context different from the first context in the plurality of contexts. A particular user interface can be caused to be displayed on the first computing device presenting data in the particular context and the second user interface of the particular program can be caused to be changed in response to the request at the first computing device to a different user interface showing a context in the plurality of contexts different from the second context. The particular user interface displayed on the first computing device can present data in the second context and the different user interface displayed on the second computing device can show the first context. The particular user interface can be the second user interface and the different user interface can be the first user interface. A first user input can be received through the particular user interface at the first computing device and the first user input can be communicated to the second computing device to effect a change on the different user interface. Further, identifying that the second computing device is substantially co-located with the first computing device in the particular physical location can include determining whether the second computing device is within range of a particular wireless network, such as a Bluetooth network. The first computing device, in some instances, can be designated a lead device within the use session. Permissions can be defined for at least the second computing device within the use session at the lead first computing device. The second computing device can display the second user interface at a corresponding scale and resolution for the second device. In some instances, the scale and resolution of the second device can differ from that displayed on the first device.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram illustrating an example implementation of a computing system 100 including a plurality of mobile computing devices 105, 110, 115, 120 each capable of establishing or otherwise participating in connections with one other mobile computing device, for instance, using a short range wireless network 125, including Bluetooth- or WiFi-enabled networks. Further, one or more of mobile computing devices 105, 110, 115, 120 can additionally connect to other networks (e.g., 135) including private and public networks, including the Internet, to access and consume digital resources served by or otherwise made available through one or more remote computing devices (e.g., 130, 140). Some mobile computing devices can make use of various network connections to access and communicate over networks including wired and wireless networks including WiFi networks, mobile broadband networks (including GSM, CDMA, 3G, 4G, LTE, etc.), WiMAX networks, local area networks (LANs), wireless local area networks (WiLANs), virtual private networks (VPNs), among other network types and technologies.

Two or mobile computing devices (e.g., 105, 110, 115, 120) can jointly participate in a data analytics session and coordinate display of different contexts of data analyzed in an analytics session using the two or more combined displays of the two or more coordinating mobile devices. Such coordination can be facilitated using, for instance, a short range wireless network (e.g., 125). Further, mobile computing devices (e.g., 105, 110, 115, 120) participating in a collaborative analytics session can both make use of a common analytics software program or application installed and running on each of the participating mobile computing devices. Such an analytics program can be supported with, downloaded from, served by, or otherwise provided through a particular application server 130. In some instances, the analytics program can be downloaded from an application storefront onto a particular mobile device using storefronts such as Google™ Android Market, Apple™ App Store, Palm™ Software Store and App Catalog, RIM™ App World™, etc., as well as other sources. Further, an analytics application utilized by mobile computing devices in a collaborative analytics session can make use of one or more backend servers (e.g., 140), such as servers supplementing the analytics functionality of the application, providing data for use in the analytics, or otherwise providing support for a particular analytics session.

In general, "servers," "clients," and "computing devices," including computing devices used to implement system 100 (e.g., 105, 110, 115, 120, 130, 140), can include electronic computing devices operable to receive, transmit, process, store, or manage data and information associated with the software system 100. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers, clients, and computing devices (e.g., 105, 110, 115, 120, 130, 140) can each include one or more processors, computer-readable memory, and one or more interfaces, among other features and hardware. Servers can include any suitable software component or module, or computing device(s) capable of hosting and/or serving a software application or services (e.g., services of application server 130 or backend servers 140), including distributed, enterprise, or cloud-based software applications, data, and services. For instance, servers can be configured to host, serve, or otherwise manage data sets, or applications interfacing, coordinating with, or dependent on or used by other services, including analytics-focused applications and software tools. In some instances, a server, system, subsystem, or computing device can be implemented as some combination of devices that can be hosted on a common computing system, server, server pool, or cloud computing environment and share computing resources, including shared memory, processors, and interfaces.

Mobile computing devices 105, 110, 115, 120 can include laptop computers, tablet computers, smartphones, personal digital assistants, handheld video game consoles, desktop computers, internet-enabled televisions, and other devices capable of connecting wirelessly to a short range network (e.g., 125). Attributes of mobile computing devices 105, 110, 115, 120 can differ widely from device to device, including the operating systems and collection of software programs loaded, installed, executed, operated, or otherwise accessible to the device. A device's set of programs can include operating systems, applications, plug-ins, applets, virtual machines, machine images, drivers, executable files, and other software-based programs capable of being run, executed, or otherwise used by the respective devices (e.g., 105, 110, 115, 120). Other device attributes can also include peripheral devices connected or otherwise accessible to the device, and the types of network technology for which the device is adapted.

Each mobile computing device can include at least one graphical display device and user interfaces allowing a user to view and interact with graphical user interfaces of applications and other programs provided in system 100. In general, mobile computing devices can include any electronic computing device operable to receive, transmit, process, and store any appropriate data associated with the software environment of FIG. 1. It will be understood that there may be any number of endpoint devices associated with system 100, as well as any number of endpoint devices external to system 100. Further, the term "client," "endpoint device," "mobile device," and "user" may be used interchangeably as appropriate without departing from the scope of this disclosure. Moreover, while each mobile device may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
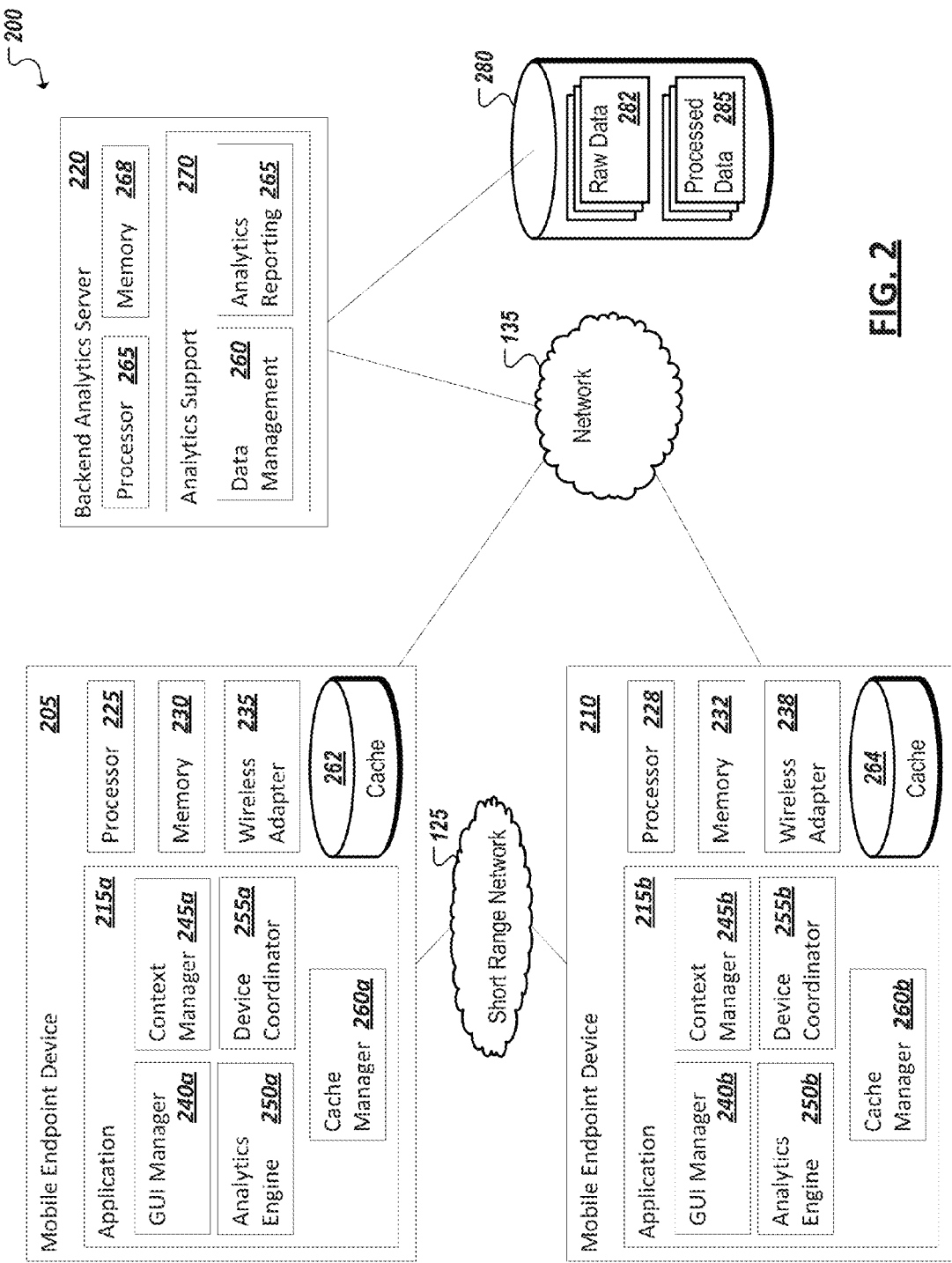
FIG. 2 is a simplified block diagram of an example system including two or more mobile computing devices and an example backend analytics server in accordance with one embodiment.

Turning to FIG. 2, a simplified block diagram 200 is shown of an example system including two or more mobile computing devices (e.g., 205, 210) and one or more example backend analytics servers (e.g., 220). A backend analytics server 220, in some instances, can be a server associated with and dedicated to providing support for a particular common analytics application (e.g., 215a, 215b) installed on the two or more mobile computing devices (e.g., 205, 210). In other instances, a backend analytics server 220 can be one of a plurality of independent backend servers that can be accessed in connection with analytics sessions realized using analytics application 215a, 215b. For instance, backend analytics server 220 can provide data and analytics data for use and further processing by analytics application 215a, 215b. Indeed, analytics application 215a, 215b can be adapted to perform analytics on a variety of different data sets provided by a variety of different systems and servers (e.g., 220). Further, in some alternative implementations, analytics application 215a, 215b can be provided by backend analytics server 220 as a service, consumed by the two or more mobile computing devices 205, 210.

Mobile computing devices 205, 210 can each include one or more processors 225, 228 and memory elements 230, 232 used to execute software stored, downloaded, or otherwise accessible to the device 205, 210, including analytics application 215a, 215b. Mobile computing devices 205, 210 can each further include one or more wireless adapters 235, 238 adapted to establish, discover, connect to, and communicate in communication sessions within one or more different short range wireless networks (e.g., 125), including ad hoc wireless networks established using Bluetooth or WiFi. Wireless adapters 235, 238 can include antennae and other hardware for transmitting and receiving radio signals to and from other devices in connection with participation within a wireless communication session over one or more short range wireless networks (e.g., 125).

Mobile computing devices 205, 210 can each include installations of a particular analytics application 215a, 215b for use in performing analytics tasks, including the generation of analytics views based on particular data sets. Such analytics tasks can be performed independently on a single computing device or collaboratively using multiple computing devices (e.g., 205, 210) that include installations of the analytics application 215a, 215b. Analytics application 215a, 215b, in some implementations, can include varied functionality, and multiple modules and components for use in providing such functionality. For instance, in one example implementation of analytics application 215a, 215b, installations of analytics application 215a, 215b on mobile devices 205, 210 can include a graphical user interface (GUI) manager 240a, 240b, analytics context manager 245a, 245b, analytics engine 250a, 250b, device coordinator 255a, 255b, and cache manager 260a, 260b, among other potential functionality and components.

In some implementations, analytics application 215a, 215b can include modules, such as GUI manager 240a, 240b, adapted to present GUIs of the analytics application 215a, 215b to a user, the GUIs including representations of one or more data sets. A data set can be one of a plurality of data sets upon which analytics application 215a, 215b can filter, process, perform statistical and analytical calculations upon, or otherwise process. Representations of the data set can provide users of the analytics application 215a, 215b with different views of the data sets. For instance, graphs, infographics, tables, and other graphical representations of certain subsets of the data set or organizations of the data set can be presented in GUIs generated using GUI manager 240a, 240b. Further, computable functions and calculations can be performed on data in the data set (e.g., using analytics engine 250a, 250b) to generate analytics results that can also be included in and supplement representations presented in GUIs generated using GUI manager 240a, 240b.

GUIs of analytics application 215a, 215b can assist users in performing analytics on the data sets. For instance, users can launch and interact with a number of analytics application 215a, 215b GUIs illustrating various different views of a subset of a data set in order to discover and analyze trends, tendencies, patterns, and other attributes of the data. Consequently, users can make real-world hypotheses and conclusions based on analytics of data describing real-world systems, entities, and phenomena. For instance, financial or investment analysts can make use of analytics concerning financial, economic, and investment-related data to identify trends within the data, for instance, using various representations and comparisons of data in a data set.

In some instances, data sets can be viewed from a particular context. A context can correspond to a logical category, subject, or theme through which particular data can be viewed. For instance, in one particular example, a data set can include data collected in connection with monitoring of a computing system (including multiple devices and users) for security events on the computing systems, the security events based on one or more security rules or policies. Interrelations among data gathered in connection with the monitoring of the computing system can cause data to be grouped and associated with logical categories or entities. For instance, in one illustrative example, data in the set can be identified and associated with one or more users or devices of a system. Accordingly, data in the set can be grouped, represented, and presented to users (i.e., in GUIs of analytics application 215a, 215b) that describes attributes of system security from either the perspective of the individual users or the perspective of devices in the system, among other potential perspectives. For instance, security data can be associated with corresponding devices to show, for instance, the security events that have been detected involving a particular device, the rules that apply to a particular device, when such rules have been violated by the particular device, when and whether security events were triggered based on such rule violations, as well as other data describing attributes of the devices, such as their identity, location, associated users, operating system, functionality, and so on. Depending upon the data that is available in the set, the functionality of the analytics application 215a, 215, and the goals of the analytics application's user, a variety of views of this device-centric security data context can be viewed, manipulated, analyzed, processed, and visualized through GUIs of analytics application 215a, 215b. Similarly, rule-centric, security-event-centric, and user-centric organizations, associations, and representations of a data set can be defined as separate contexts of the data set.

Further, in some examples, overlaps and interrelations can be identified between different contexts in a data set. In some instances, a data set can be logically organized in contexts that do not include such interrelations, or that cannot be merged or joined with data of other contexts. However, in other instances, interrelations can exist between contexts. For instance, returning to the simplified example of the previous paragraph, a relationship can be identified between a user context and a device context, for instance, based on data that identifies user's associations or uses of particular devices.

In some implementations, analytics application 215a, 215b can include a context manager 245a, 245b adapted to identify, define, and manage contexts of a particular data set. Context manager 245a, 245b can allow users, in some implementations, to identify and define contexts for a data set, for instance, by defining relationships between particular databases, database tables, data objects, or other data structures that correspond to a particular context. For instance, a user can identify how various data, including information about persons in a group of people, can be combined, joined, merged, or otherwise logically associated so as to develop organizations, calculations, and presentations of the data to describe attributes of persons in the group of people (i.e., based on the combined data). Further, in some instances, context manager 245a, 245b can identify associations, relationships, and commonalities within data of a set, for instance, by identifying like-named data fields or data attributes, identifying data set keys, performing database sort and join operations, among other techniques.

As noted above, analytics application 215a, 215b can organize and allow users to analyze data from the perspective of a particular context. Accordingly, GUIs of analytics application 215a, 215b can also be generated and presented that represent a data set based on a particular context. Further, GUIs of analytics application 215a, 215b can allow users to view the data set from different contexts, and even toggle between contexts when viewing data. In some instances, a user may desire to manipulate or filter a data set within a first context and identify how such manipulations are reflected within representations of the data set in a second context. As a simplified example, a data set of basketball statistics can include contexts for analyzing the data set from the perspective of individual players' performance as well as a context for analyzing the data from the perspective of teams' performance (as well as potentially other contexts, such as the nationalities of players represented in a particular league, financial performance of teams or a league, and so on). In this particular simplified example, a user can view a subset of the basketball statistics data from the player-centric context and sort or filter the subset (e.g., using a corresponding GUI provided through analytics application 215a, 215b). For example, a user can filter a player-centric view of the data to identify players (and corresponding user attributes (e.g., performance trends and statistics)) with a particular amount of collegiate playing experience (e.g., the type of amateur playing experience of the player prior to playing professionally). The user may be interested in knowing how this filter would apply to teams of players. Accordingly, the user, in some implementations of analytics application 215a, 215b (e.g., using context manager 245a, 245b) can toggle to or simultaneously view (e.g., in another pane or window of the GUI) how the filter affects a second view of the data set geared to the team-centric context. For instance, the user may filter a player-centric view to identify those players identified in the data set that played four years in college. In turn, a representation of the data set in the team-centric context can be filtered, ranked, or sorted based on the presence or absence of the identified four-year-collegiate players (i.e., identified in the player-centric context) within teams represented in the team-centric context. Moreover, the user can then apply additional team-centric filters, sorts, calculations, or other analytics operations (e.g., using the team-context GUI window) and observe how these further analytics operations affect the player-context representations of the data.

In some instances, it can be inconvenient to toggle between multiple GUI windows or panes of different contexts so as to observe, for instance, relationships between various data set contexts. Additionally, it may be desirable to allow multiple users to collaborate in multi-context data analyses, for instance, with each user responsible for observing, manipulating, and/or interacting with the data set within a respective context. In yet another use case, a user may wish to highlight attributes of a particular first data set context (e.g., in connection with a multimedia presentation), by interacting with a representation of the data set in another context, thereby using interaction within the other context to "control" representations of the data in the first context.

In one practical example, offered as a non-limiting example for illustrative purposes only, an IT administrator may desire to illustrate particular issues relating to security policies within a system. Through analytics application 215a, 215b, the IT administrator may be able to analyze and visualize, and present security data for the system in multiple contexts, for instance, in a security-event-centric context and a security-policy-centric context. The IT administrator may find it convenient to search, filter, and perform analytics operations from the viewpoint or context of security events afflicting a system. By manipulating a GUI showing security data within the security event context, the IT administrator may be able to highlight which security policies are triggering or are involved in these security events. However, given that the IT administrator is interested in illustrating issues with the security policies and not the security events, the IT administrator may desire to have those viewing his presentation view a security-policy-centric representation of the data, affected by the sorting of security events within a security-event context. For example, a user can use a security event context infographic (e.g., presented in a security event context GUI of analytics application 215a, 215b) illustrating security events to filter for firewall-related security events. Filtering the set of security events can result in an automatic filtering of a security-policy-centric infographic (e.g., presented in a security policy context GUI of analytics application 215a, 215b) so that the security-policy-centric infographic is only based on information and data pertaining to security policies involved or associated with the filtered set of firewall-related security events. In some instances, the security event context GUI can be presented on a first device and the security policy context GUI is displayed on a second device in communication with the first device. In a sense, in this example, the first device acts as a remote control for the GUI displayed in the second device.

In further examples, analytics can be performed cooperatively or collaboratively between multiple computing devices (e.g., 205, 210) each running an instance of analytics application 215a, 215b. Analytics application 215a, 215b can include a device coordinator 255a, 255b adapted to allow one instance of analytics application (e.g., 215a) to set up, initiate, join, or otherwise function collaboratively with another instance of analytics application (e.g., 215b). A collaborative operation session can be established using device coordinator 255a, 255b to engage corresponding computing devices (e.g., 205, 210) in a communication session, for instance, over a short range network 125 in connection with wireless adapters 235, 238. Further, as instances of analytics application 215a, 215b can operative cooperatively, for instance, within an analytics session involving a common or overlapping data set, a cache manager 260a, 260b can be used in connection with the device coordinator 255a, 255b to coordinate access to a common data set. For instance, the data set to be collaboratively analyzed using cooperating instances of analytics application 215a, 215b can be each accessed from a remote source (e.g., backend analytics server 220 or another source), or can be accessed locally from a cache 262, 264 of the respective instance of analytics application 215a, 215b or the hosting device 205, 210.

Backend analytics server 220 can also include one or more processor devices 265 as well as memory elements 268 used to execute software stored, downloaded, or otherwise accessible to backend analytics server 220, including an analytics support module 270 adapted to provide data and services in connection with operation of examples analytics applications (e.g., 215a, 215b) on remote mobile computing devices (e.g., 205, 210). For instance, in one example implementation, analytics support module 270 can include functionality, and modules and components for use in providing such functionality, including a data management module 260, analytics reporting engine 265, cache updater 270, and device manager 275. Further, in some examples, backend analytics server 220 can further include one or more data stores (e.g., 280) for use in storing and maintaining data used, for instance, by analytics support module 270 in connection with analytics sessions performed using one or more installations of analytics applications (e.g., 215a, 215b) on remote mobile computing devices (e.g., 205, 210).

As noted above, backend analytics server 220 can be used to provide or update data sets used by one or more instances of an analytics application 215a, 215b on one or more remote computing devices, such as mobile computing devices 205, 210. For instance, backend analytics server 220 can serve or host raw data 282, including multiple different data sets stored in one or more data stores 280. A data management module 260 can be used to select and provide data (e.g., from data 282) to remote computing devices (e.g., 205, 210) running an instance of one or more different analytics applications 215a, 215b. Additionally, in some instances, backend analytics server 220 can possess some higher-end functionality and be adapted to perform analytics operations, calculations, and analyses on raw data 282. For instance, backend analytics server 220 can make use of higher capacity or more powerful processing capabilities (as compared to the processing power of mobile devices 205, 210) to perform certain analytics operations (e.g., using analytics reporting engine 265). Such operations can, in some instances, be provided to client analytics applications (e.g., 215a, 215b) as a service over a network 135. Further, analytics results and other processed data 285 generated by one or more backend analytics servers (e.g., 220) can be maintained by a backend analytics server 220 (e.g., using analytics reporting engine 265).

Turning to FIGS. 3A-3G, block diagrams 300a-g are shown illustrating various operations and transactions involving mobile computing devices in an example cooperative analytics sessions. For instance, in FIG. 3A, a block diagram 300a is shown illustrating a plurality of mobile computing devices 305, 310, 315 substantially collocating within a particular location so as to each be capable of communicating with the other devices in a short range wireless network 320 (e.g., such as a piconet, or ad-hoc wireless network established via Bluetooth). In some instances, mobile computing devices 305, 310, 315 when so enabled, can identify other computing devices adapted to communicate with the mobile computing device over the short range wireless network 320. Accordingly, mobile devices 305, 310, 315 can discover other mobile devices in range as well as identify certain attributes and parameters of the in-range mobile devices (e.g., through preliminary messages, such as Service Discover Protocol (SDP) messages). In some examples, among the attributes discoverable by other mobile devices 305, 310, 315 in short range wireless network 320, devices can identify whether other discovered mobile devices currently are running or have available one or more compatible applications. For instance, a first mobile device 305 running an analytics application 325a can attempt to discover other mobile devices in short range wireless network 320 that are also running (or have available) the analytics application 325a (or another analytics application compatible with analytics application 325a and adapted to operate collaboratively with analytics application 325a over short range wireless network 320).

Figure 3A:
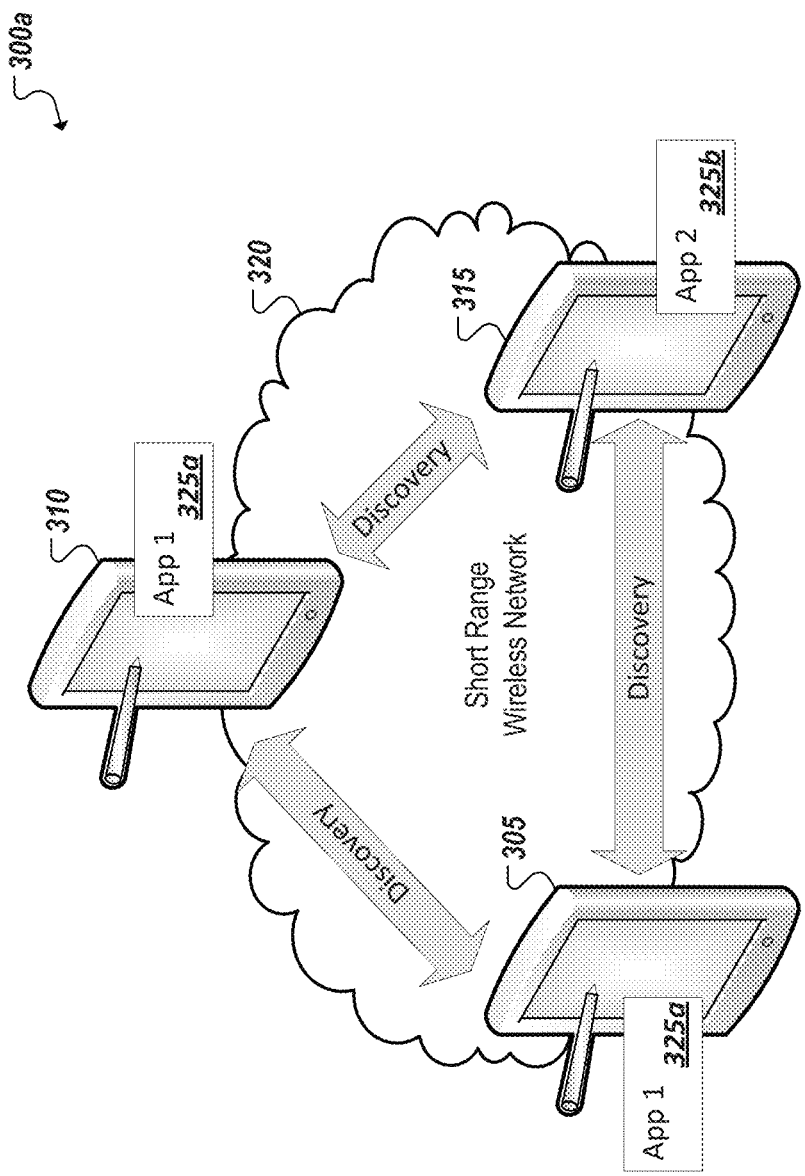
FIGS. 3A-3G illustrate example tasks in connection with example cooperative analytics session involving two or more mobile devices in accordance with at least some embodiments.

In the particular example of FIG. 3A, a first mobile device 305 discovers two other mobile devices 310, 315 within range of and capable of communicating through short range wireless network 320. Further, first mobile device 305 can discover that one of the mobile devices 310 also includes the analytics application 325a. Based on the discovery, first mobile device 305 can attempt to establish a collaborative operation session with mobile device 310 (e.g., between their respective instances of analytics application 325a) over short range wireless network 320. Further, mobile device 305 can determine that a remaining mobile device 315 does not include, run, or otherwise have available an application capable of collaboratively operating with analytics application 325a (e.g., mobile device 315 instead including or running a different, incompatible application 325b). Accordingly, mobile device 305 can abandon an attempt to establish communication with mobile device 315.

Upon discovering at least one other mobile device running a compatible instance of an analytics application (e.g., 325a), the mobile devices can communicate and exchange messages to establish an ad hoc network and communication session between the two or more devices (e.g., 305, 310). Establishing communication between mobile devices over a short range wireless network (e.g., 320) can involve the mobile devices exchanging messages to negotiate the terms of the communications (e.g., frequency band(s) used, frequency hopping coordination, messaging protocols used, master/ slave relationships, device permissions, etc.). Negotiation of the communication session can take place in accordance with one or more wireless communication protocols, including Bluetooth and WiFi. In some instances, one of the mobile devices can be designated as a lead device (i.e., the master), with other devices deferring to the lead device (i.e., as slaves). In some instances, one of the mobile devices (e.g., 305) in a short range wireless communication environment can initiate the joining together of devices into one or more sessions or piconets. For instance, a user of the first device 305 can desire to initiate a collaborative analytics session and attempt to have the first device 305, in connection with analytics application 325a, attempt to discover other mobile devices (e.g., 310) making use of analytics application 325a. Another user (or the same user) can be in control of the other mobile devices and accept a request or identified collaboration opportunity initiated by the first device 305, allowing the other device to connect to and participate in a collaborative session using analytics application 325a.

Figure 3B:
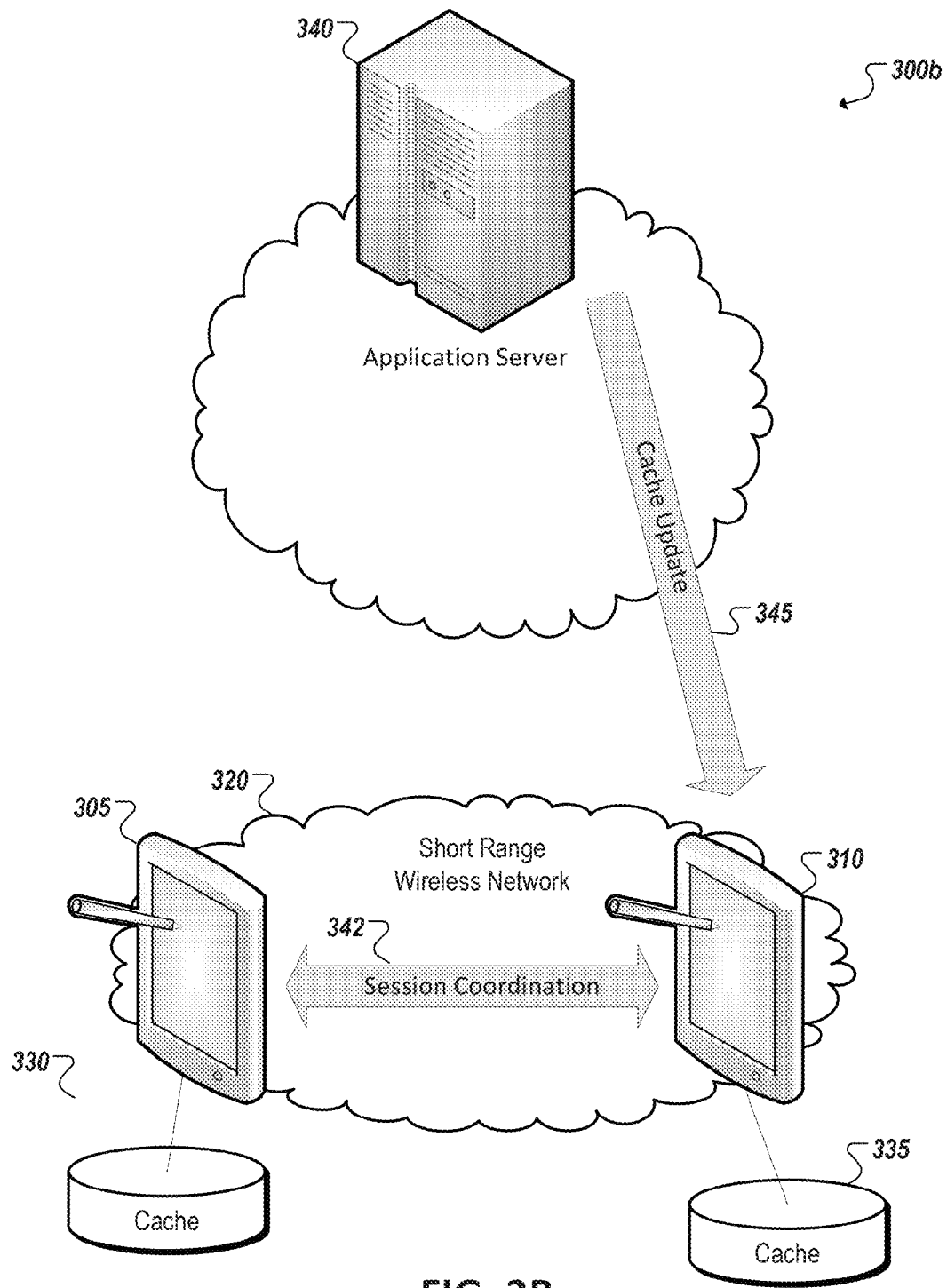

Turning to FIG. 3B, in some instances, establishing a collaborative analytics session using two or more mobile devices 305, 310 can involve one or both of the mobile devices (and their respective instances of an analytics application 325a) coordinating the data set, or portion of a data set, that will serve as a source for analytics operations performed using an analytics application (e.g., 325a). In some instances, a particular analytics application can be dedicated to and designed for a particular data set (such as an enterprise-specific analytics application built specifically for the enterprise's own data), and coordination of the data set 325a may not be relevant. In other instances, analytics application 325a may be adapted to potentially handle a variety of different data sets served by a variety of sources. In some instances, collaborating analytics applications 325a can coordinate use of and access to a particular data set served by a particular computing device, including a computing device remote from the mobile devices 305, 310. In such instances, analytics applications 325a can communicate with the data server during the analytics session to perform particular collaborative analytics operations. In other instances, at least a portion of the data set used in the collaborative analytics session can be copied and accessed from the cache of the analytics application (e.g., 325a) and/or hosting mobile device 305, 310. Accordingly, in some examples, as shown in FIG. 3B, coordinating mobile devices 305, 310 and analytics application instances can coordinate to ensure that the data set to be used in a collaborative analytics session is made available on each of the respective caches 330, 335 of the collaborating systems 305, 310. For instance, mobile devices 305, 310 can exchange messages (e.g., at 342) to coordinate and identify the data set to be operated upon. In some instances, a designated lead device or analytics application instance (e.g., at device 305), such as the device initiating the collaborative analytics session, can dictate the data that is to be the subject of the collaborative analytics session.

In response to selecting a particular data set or portion of a data set, one or both of the mobile devices 305, 310 can attempt to update or supplement their respective caches 330, 335 to provide the relevant data to their respective instances of an analytics application (e.g., 325a). In the example of FIG. 3B, mobile device 310 can identify that it is unprepared to participate in a requested collaborative analytics session with mobile device 305 based on a determination that the cache 335 of mobile device 310 does not include all of the data that is expected by accessed locally in the collaborative analytics session. Accordingly, mobile device 310 (or in some instances, mobile device 305, on behalf of mobile device 310) can request that data hosted by a particular data server 340 be sent to mobile device 310 to update (e.g., at 345) the cache of mobile device 310 in preparation for a collaborative analytics session involving the data.

Figure 3C:
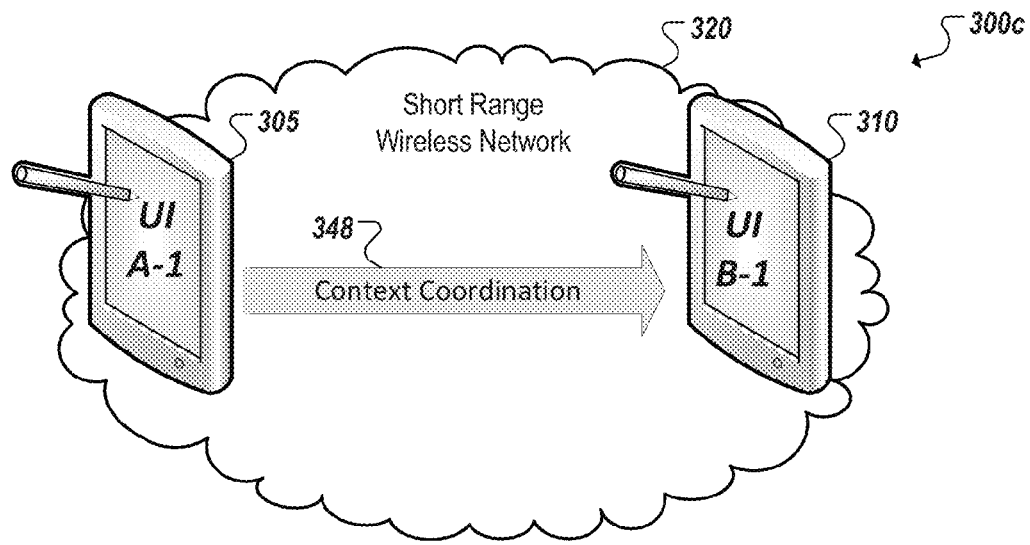

As noted above, in some instances, analytics involving a particular data set (e.g., from a cache 330, 335 of an analytics application) can include the identification and definition of distinct, and in some cases interrelated, analytics contexts for the data set. In the example of FIG. 3C, a collaborative analytics session has been established between two mobile computing devices 305, 310 using short range wireless network 320 that involves a data set with multiple contexts. In some implementations, users of the collaborating devices 305, 310 can specify the respective context(s) to be considered in a collaborative analytics session and used, for instance, in presentations of data on the respective collaborating devices 305, 310. In some instances, it can be advantageous to have each of the collaborating devices 305, 310 displaying views (in analytics application GUIs) of the data set using different contexts, allowing a user (or users) to conveniently view and simultaneously interact with the contexts on distinct devices to perform analytics operations leveraging interrelations between the separate contexts. In one example, a user of a lead collaborative device (e.g., 305) can specify two or more contexts that are to be the subject of a particular collaborative analytics session. In other instances, the analytics application of the lead device can identify available interrelated contexts for a data set and present the contexts to a user (e.g., of a lead device in the session) for selection and use within a collaborative analytics session. Further, in some instances, the analytics application can itself determine a set of two or more contexts for use in a multi-context collaborative analytics session. Indeed, in some instances, only two contexts may be available and will, by default, be the contexts used in a multi-context collaborative analytics session.

Further, in some examples, a particular one of the identified available contexts can be selected for use in one of the mobile devices (e.g., 305) participating in a multi-context collaborative analytics session. Accordingly, based on the context selected for data organization, analytics controls, and GUI presentation (e.g., a first GUI of context A, or "UI A-1") on a first collaborating mobile device 305, another complimentary context(s) can be selected automatically for the other devices participating in a collaborative analytics session. For instance, based on the use of context A at mobile device, coordination messages (e.g., 348) can be exchanged identifying or requesting that the analytics application of cooperating mobile device 310 present data and perform analytics operations within a second complimentary context B. Accordingly, one or more GUIs of analytics application operating on mobile device 310 can be presented based on context B (e.g., a first GUI of context B "UI B-1").

A multi-context collaborative analytics session can be useful in a variety of scenarios. For example, mobile devices participating in a collaborative analytics session can be used by a plurality of participants collaborating within a meeting. In other instances, one of the mobile devices (e.g., a lead device) in a collaborative analytics session can be used by a presenter (through interactions with a first context) to drive presentations (of a second context) on participating mobile devices viewed by attendees of the presentation. For instance, a first mobile device can be used to drive presentation of a second mobile device connected to a monitor device or projector that permits the data presented in the second context to be viewed by a plurality of attendees. In such instances, the lead mobile device can be thought of as a rich-content remote control of one or more other mobile device presentations, the lead device controlling a second context displayed on the other mobile device through the rich content of the first context. Such collaborative analytics session can be used in a variety of environments including classroom presentations and discussion groups, business and government presentations and meetings, problem solving and analytics sessions involving multiple users, planning sessions, and other environments.

Figure 3D:
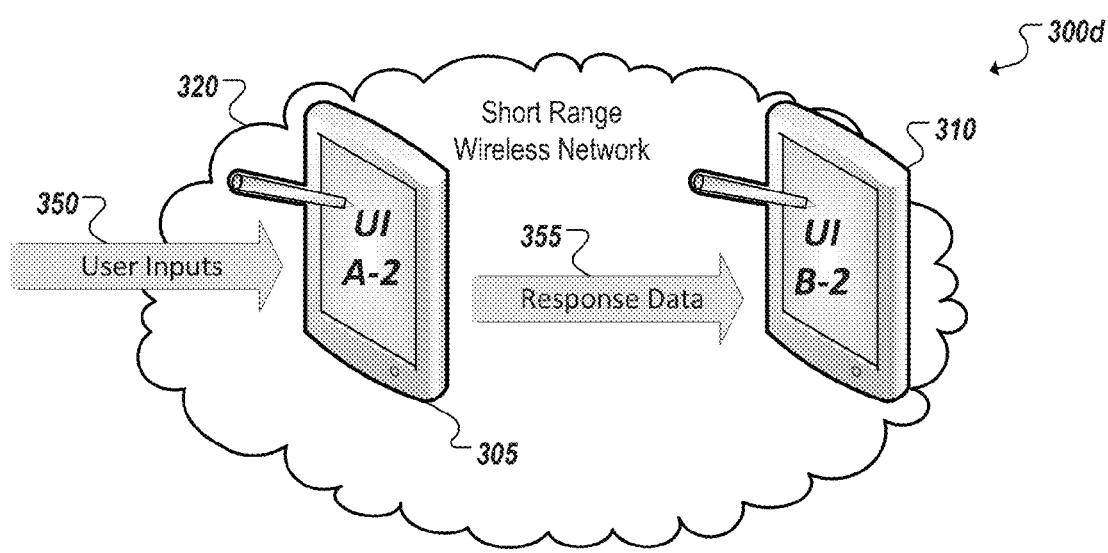

Turning to FIG. 3D, a user of a first mobile device 305 can interact with GUIs presented in a mobile device presenting representations of a data set within a first context. For instance, a mobile device can be equipped with a touchscreen or other interface device allowing the user to select, filter, sort, search, perform calculations and other analytics operations using a GUI of the analytics application based on a first context (e.g., UI A-1). Inputs 350 received from the user through the first GUI of the first context can identify subsets of data, generate analytics results, or perform analytics operations that can result in new data organizations and/or data subsets being identified. Data identified (or generated) through interactions with the first GUI can be associated with data presented or capable of being presented within a second context, for instance, through second context GUIs displayed on collaborating mobile device 310. Accordingly, response data 355 communicating the effect of certain interactions with a GUI of a first context on a first collaborating mobile device 305 can be communicated to the analytics application of a second device 310 to effect changes to data organizations, representations, and presentations of a second context of the data on the second device 310. For instance, a user can filter data presented in the first context on the GUI UI A-1 on the first device 305 to change the subset of data presented on the first device (e.g., resulting in a change to the GUI, represented in FIG. 3D as a second GUI of the first context UI A-2). In some instances, the interactions with the GUI of the first context on the first device 305 can affect a change in the GUI (e.g., largely preserving GUI UI A-1) while causing the GUI of the second context on the second device to change, while in other instances user inputs 350 can also cause a change in the GUI on the first device. Further, in response to the response data 355 communicating the effects of certain user inputs 350 received as a first device 305 (e.g., a lead device), the analytics application of the second device 310 can update a GUI of a second context to reflect how the effect of the user inputs 350 relates to the second context.

In one non-limiting example, provided for purposes of conveniently illustrating some of the principles above, a GUI UI A-1 can show data describing attributes of and performance of particular investment portfolios or funds. A second context of the analyzed data set, relating attributes and performance of individual stocks exchanged in one or more markets, can be automatically selected to cause a GUI UI B-1 to present attributes of a universe of such stocks. A user input 355 on device 305 can select (though UI A-1) a subset of investment funds. As a result, an identification of the user input and/or resulting subset of investment fund data can be communicated (e.g., at 355) to the second collaborating device 310. Further, based on the reporting data, the analytics application of the second device 310 can identify a subset of the stocks represented in UI B-1 that are included in the subset of investment funds identified from user inputs 350 and update UI B-1 (to generate UI B-2) for presentation to users of collaborating device 310. Such presentations (e.g., in GUIs A-1, A-2, B-1, B-2, etc.) can include listings or tables of the data framed within a corresponding context as well as more complex, sophisticated, or visually creative representations or infographics of the data. As one example, UI B-1 may be initially set (e.g., by a user, including users of a lead device in the collaborative analytics session) to display a pie chart or other graphic that utilizes data relating to a first set of stocks. Response data 355 received in response to user inputs 350 can cause the pie chart or other graphic to be automatically updated (at UI B-2) to reflect a subset of those stocks related to the subset of investment funds identified through the user input 355 on device 305 (e.g., the stocks included in a selected subset of investment funds specified through UI A-1). It should be appreciated that this simplified example is one of among potentially limitless other examples.

Figure 3E:
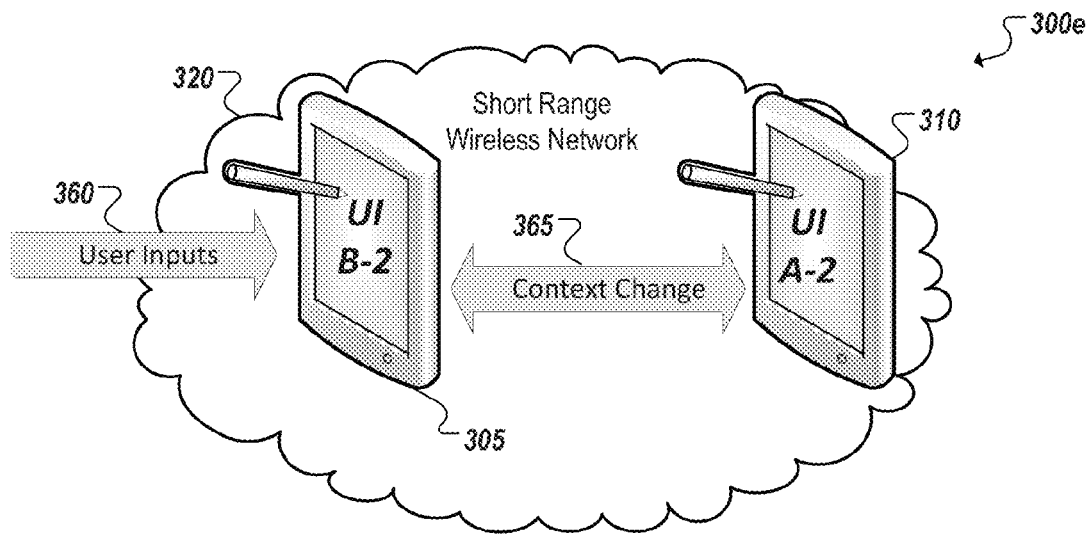
Figure 3F:
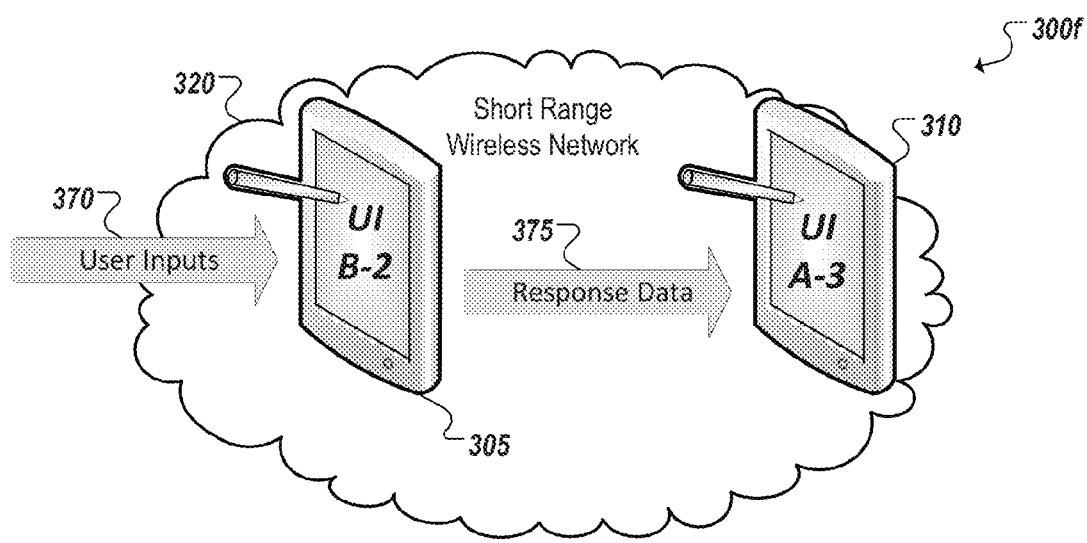

In some instances, it can be desirable to change the context used at one of the devices 305, 310 in a collaborative analytics session. For instance, as shown in a FIG. 3E, other user inputs 360 can be received indicating that a user desires to change the context of data presented at the first collaborating device 305. Indeed, in some instances, a user can request to "flip" the contexts of two or more collaborating devices so that the context (and perhaps also the GUI) presented on a first collaborating device (e.g., 305) are adopted by a second device (e.g., 310) and the context of the second device is adopted and presented on the first device. This can be useful, for example, when a user wishes to share how certain results (driven using a first context) were achieved, or when it is useful to change the direction of a presentation or data analysis, driving presentations instead using the second context. For instance, as shown in FIG. 3E, inputs 370 received while mobile device 305 is displaying UI A-2 (such as in the example of FIG. 3D) can indicate a user's desire to flip contexts with collaborating device 310, resulting in a context change command 365 being communicated to the other collaborating device 310. Accordingly, collaborating devices 305, 310 can exchange data to permit the respective contexts and/or GUIs of the collaborating devices 305, 310 to be exchanged and adopted by the other device. For instance, GUI UI B-2 originally presented at collaborating device 310, can be changed to display at collaborating device 305, while GUI UI A-2 is instead presented at collaborating device 310, as shown in FIG. 3E. Further, as shown in FIG. 3F, following a context change, whether through a context flip or a selection of an otherwise different context to be used at either of the collaborating devices (e.g., 305, 310), additional user inputs 370 can be received prompting (through corresponding response data 375) updates to the GUI of the other collaborating device, consistent with the principles described in connection with the examples of FIG. 3D.

Figure 3G:
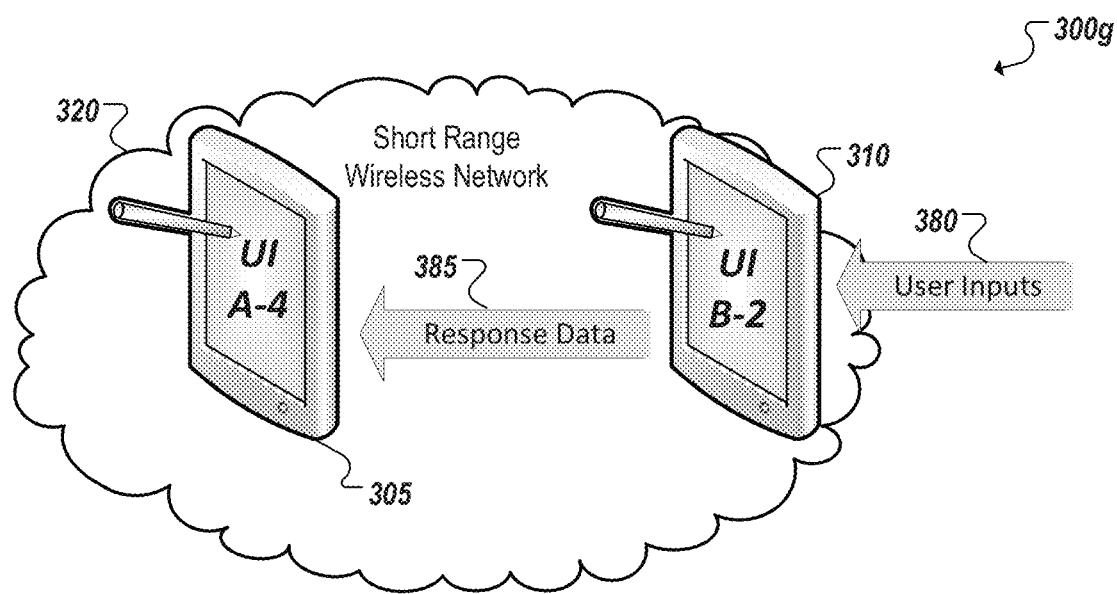

In some instances, context changes, analytics operations, GUI manipulations, and other interactions with data utilized in a collaborative analytics session can be carried out at any device included in the collaborative analytics session to affect changes in GUIs of other participating collaborating devices. As one example, illustrated in FIG. 3G, user inputs received at second collaborating device 310 can be received corresponding to users' interactions with a second context GUI UI B-1 displayed at the device. The user interactions can cause the GUI to be updated or otherwise changed to UI B-2, as shown in the example of FIG. 3G. Further, response data 385 can be generated by the instance of an analytics application running on the second device 310 and communicated to the first device 305 to affect a change on the GUI displayed of a first context on the first device 305. For example, user inputs 380 at the second device 310 can result in a GUI UI A-1 initially displayed at the first device 305, to be changed or updated to a different GUI UI A-4.

Further, in some implementations, inputs (e.g., 380) received at a collaborating device (e.g., 310) other than a designated lead device (e.g., 305) can cause changes to GUIs of the lead device. However, in some instances, a user of a lead device can set particular permissions and roles for other (i.e., slave) devices in a collaborative analytics session. For instance, rules can be set controlling which and to what extent devices in a collaborative analytics session can accept user inputs, change contexts used by the corresponding analytics application on the device, interact with and perform analytics tasks using GUIs of the corresponding analytics application on the device, and so forth. For example, in some cases, certain tasks within a collaborative analytics session can be reserved for a designated lead device. For instance, if a lead device is to serve as a controller of presentations on other collaborating devices, most if not all analytics tasks and GUI operations within the collaborative analytics session may be reserved for and performed using the lead device. However, in use cases where the collaborative analytics session facilitates collaborative data analysis among a plurality of users each using a respective collaborating device, more if not all analytics task permissions may be shared among the collaborating devices. Further, designation of a lead device can be changed during a collaborative analytics session, in some instances, for example, to pass control of a presentation or collaboration session to another user (such as a user controlling and viewing a particular context of the collaborative analytics session). Additionally, a lead device can remove or dismiss other collaborating devices as well as add additional devices to the session (e.g., when a new device is detected within range of the short range wireless network facilitating the collaborative analytics session), among other examples.

FIG. 4 is a simplified flowchart 400 illustrating an example technique for establishing a cooperative analytics session using two or more mobile computing devices. For instance, at least one other mobile device can be identified 405 (e.g., by a first mobile device) within range of a particular network, such as a short range wireless network. If the identified other mobile device is identified (e.g., at 410) as utilizing a particular software application, also utilized by a first mobile device, the identified mobile device can be joined 415 with the first mobile device in a use session involving the particular software application. In some instances the particular application can be adapted to perform one or more data analytics tasks and operations. Further, determining 410 whether the other mobile device utilizes the particular application can involve determining whether both the first mobile device and the other mobile device are each currently running the particular application. If it is determined 415 that the other mobile device does not utilize the particular application, the other mobile device can be subsequently ignored 420 by the first mobile device.

In instances where two or more mobile devices have been joined 415 in a collaborative use session, for instance, over a short range wireless network, an analytics context used by the first device can be determined 425, for instance, in response to a user selection of a particular context in a plurality of contexts or a particular user interface representing the particular context. For example, if it is determined 425 that the first mobile device utilizes a first analytics context (e.g., in a GUI displayed on the first mobile device), a different, second context can be automatically identified for the other mobile device and a GUIs showing the second context can be caused 430 to be displayed on the other mobile device. Alternatively, if the second (or another) context is determined to be utilized at the first mobile device, a different context, such as the first context, can be automatically identified and incorporated (e.g., at 435) in GUIs presented on the other mobile device.

In some instances, two or more mobile devices joined 415 in a collaborative use session can different display capabilities, including different graphics cards and display devices with varying sizes, resolutions, scales, format, aspect ratios, etc. In some instances, causing 430 the second user interface to be displayed on the second device can include translating, scaling, or otherwise adapting a user interface of the particular program to the second device. Indeed, in some instances, a user of the second device (and/or first device) can be presented with a separate GUI allowing the user to specify display characteristics (e.g., aspect ratio, format, etc.) for the user interface of the particular program on either of the first and second devices. Providing this adaptability can allow presentation of user interfaces within the collaborative use session to be adapted to or optimized for each of the varying devices participating in the session.

Inputs received on one mobile device operating in the collaborative use session can automatically cause GUIs of the other mobile devices in the collaborative use session to be updated or otherwise modified. For instance, a user input received at the first device (e.g., at 440, 450) through the GUI of the first device, can relate to the context utilized at the first device but nonetheless cause 445, 455 a change or modification to the GUI (of a different context) displayed at other devices in the collaborative use session. The collaborative use session can comprise a collaborative analytics session allowing users to manipulate data within alternate contexts and observe the effects, in a second context, of a data manipulation within a first context.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, loadbalancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, the instructions when executed on a machine, to cause the machine to:

identify, using a first computing device running a particular program comprising an analytics application, a second computing device running the particular program, wherein the second computing device is identified as substantially co-located with the first computing device in a particular physical location;

join the first computing device and the second computing device in a use session of the particular program, wherein the use session is a collaborative analytics session, wherein the particular program is to facilitate user analysis of a data set in the use session;

determine that the first computing device displays a first interactive user interface of the particular program at a first instance of time, the first user interface to display a representation of the data set in a first context in a plurality of contexts;

cause the second computing device to display a second interactive user interface of the particular program at the first instance of time based at least in part on the first user interface using the first context, the second user interface to display a representation of the data set in a different, second context in the plurality of contexts, wherein the second computing device displays the representation of the data set in the second context simultaneously with the first computing device displaying the representation of the data set in the first context;

receive user input at the first computing device, the user input resulting in the first computing device displaying a modified representation of the data set in the first context; and in response to receiving the user input at the first computing device, cause the second computing device to display a modified representation of the data set in the second context, wherein the modified representation of the data set in the second context displayed by the second computing device is based on the user input received at the first computing device.

2. The storage medium of claim 1, wherein the instructions, when executed, further cause the machine to:
receive, at a second instance subsequent to the first instance, a first user input at the first computing device; and
communicate the first user input to the second computing device to effect a change on the second user interface of the particular program resulting in presentation of an updated second user interface on the second computing device.

3. The storage medium of claim 2, wherein the first user input also effects a particular change on the first user interface of the particular program resulting in presentation of an updated first user interface on the first computing device.

4. The storage medium of claim 2, wherein the first user input is received through the first user interface.

5. The storage medium of claim 1, wherein an analytics operation in the first context affects data included in the second context.

6. The storage medium of claim 5, wherein the analytics operation filters data within the first context to identify a first subset of data and the analytics operation affects data included in the second context by filtering the data included in the second context according to the filtering of data within the first context.

7. The storage medium of claim 6, wherein:
the analytics operation is performed using the first user interface at a second instance subsequent to a first instance and causes a change to the first user interface, the first user interface displaying a representation of the data within the first context at the first instance and a changed representation of the filtered data at the second instance, and
the filtering of data included in the second context in response to the analytics operation causes a change to the second user interface, the second user interface displaying a representation of the data within the second context at the first instance and a changed representation of the filtered data after the second instance.

8. The storage medium of claim 1, wherein each instance of the analytics application on the first and second computing devices accesses a particular data set and the collaborative analytics session involves analytics on the particular data set.

9. The storage medium of claim 8, wherein the particular data set is provided by a server remote from the first and second computing devices.

10. The storage medium of claim 8, wherein each instance of the analytics application on the first and second computing devices accesses the particular data set in a respective cache of the first and second computing devices.

11. The storage medium of claim 10, wherein the instructions, when executed, further cause the machine to coordinate the caches of the first and second computing devices so that the particular data set is accessible from each of the caches of the first and second computing devices.

12. The storage medium of claim 1, wherein the instructions, when executed, further cause the machine to:
receive a request at the first computing device requesting that a user interface of the particular program present data in a particular context different from the first context in the plurality of contexts;
cause a particular user interface to be displayed on the first computing device presenting data in the particular context; and
cause the second user interface of the particular program to be changed, in response to the request at the first computing device, to a different user interface showing a context in the plurality of contexts different from the second context.

13. The storage medium of claim 12, wherein the particular user interface displayed on the first computing device presents data in the second context and the different user interface displayed on the second computing device shows the first context.

14. The storage medium of claim 13, wherein the particular user interface is the second user interface and the different user interface is the first user interface.

15. The storage medium of claim 12, wherein the instructions, when executed, further cause the machine to:
receive, through the particular user interface, a first user input at the first computing device; and
communicate the first user input to the second computing device to effect a change on the different user interface.

16. The storage medium of claim 1, wherein identifying that the second computing device is substantially co-located with the first computing device in the particular physical location includes determining whether the second computing device is within range of a particular wireless network.

17. The storage medium of claim 16, wherein the particular wireless network includes a Bluetooth network.

18. The storage medium of claim 1, wherein the first computing device is designated a lead device within the use session.

19. The storage medium of claim 18, wherein the instructions, when executed, further cause the machine to define permissions of at least the second computing device within the use session at the lead first computing device.

20. The storage medium of claim 1, wherein the second computing device displays the second user interface at a corresponding scale and resolution for the second device.

21. A method comprising:
identifying, using a first computing device running a particular program comprising an analytics application, a second computing device running the particular program, wherein the second computing device is identified as substantially co-located with the first computing device in a particular physical location;
joining the first computing device and the second computing device in a use session of the particular program, wherein the use session is a collaborative analytics session, wherein the particular program is to facilitate user analysis of a data set in the use session;
determining that the first computing device displays a first interactive user interface of the particular program at a first instance of time, the first user interface to display a representation of the data set, in a first context in a plurality of contexts; and
causing the second computing device to display a second interactive user interface of the particular program at the first instance of time based at least in part on the first user interface using the first context, the second user interface to display a representation of the data set, in a second context in the plurality of contexts, wherein the second computing device displays the representation of the data set in the second context simultaneously with the first computing device displaying the representation of the data set in the first context;

receiving user input at the first computing device, the user input resulting in the first computing device displaying a modified representation of the data set in the first context; and in response to receiving the user input at the first computing device, causing the second computing device to display a modified representation of the data set in the second context, wherein the modified representation of the data set in the second context displayed by the second computing device is based on the user input received at the first computing device.

22. An apparatus comprising:

a memory configured to store data;

a processor operable to execute instructions associated with the data; and an analytics application, adapted when executed by the at least one processor device to facilitate a cooperative analytics session by:

identifying a second computing device running a program compatible with the particular program, wherein the second computing device is identified as substantially co-located with the first computing device in a particular physical location;

joining the first computing device and the second computing device in a use session involving the particular program, wherein the use session is a collaborative analytics session, wherein the analytics application is to facilitate user analysis of a data set in the use session;

determining that the first computing device displays a first user interface of the particular program at a first instance of time, the first user interface to display a representation of the data set, in a first context in a plurality of contexts; and causing the second computing device to display a second user interface at the first instance of time based at least in part on the first user interface using the first context, the second user interface to display a representation of the data set, in a second context in the plurality of contexts, wherein the second computing device displays the representation of the data set in the second context simultaneously with the first computing device displaying the representation of the data set in the first context;

receiving user input at the first computing device, the user input resulting in the first computing device displaying a modified representation of the data set in the first context; and in response to receiving the user input at the first computing device, causing the second computing device to display a modified representation of the data set in the second context, wherein the modified representation of the data set in the second context displayed by the second computing device is based on the user input received at the first computing device.

23. The apparatus of claim 22, wherein the representation of the data set in the first context comprises first data based upon the data set and the representation of the data set in the second context comprises second data based upon the data set, the second data being different from the first data.

24. The apparatus of claim 22, wherein the user input specifies a data filtering operation to be performed on the data set.

* * * * *